(12) United States Patent
Zhang

(10) Patent No.: US 12,488,864 B2
(45) Date of Patent: Dec. 2, 2025

(54) APPARATUSES AND METHODS FOR ADAPTIVELY CONTROLLING CRYOABLATION SYSTEMS

(71) Applicant: Varian Medical Systems, Inc., Palo Alto, CA (US)

(72) Inventor: Hongxuan Zhang, Austin, TX (US)

(73) Assignee: VARIAN MEDICAL SYSTEMS, INC., Palo Alto, CA (US)

( * ) Notice: Subject to any disclaimer, the term of this patent is extended or adjusted under 35 U.S.C. 154(b) by 182 days.

(21) Appl. No.: 17/697,216

(22) Filed: Mar. 17, 2022

(65) Prior Publication Data

US 2023/0298709 A1 Sep. 21, 2023

(51) Int. Cl.
*G16H 10/60* (2018.01)
*G16H 20/40* (2018.01)

(52) U.S. Cl.
CPC ............. *G16H 10/60* (2018.01); *G16H 20/40* (2018.01)

(58) Field of Classification Search
CPC ............................... G16H 10/60; G16H 20/40
See application file for complete search history.

(56) References Cited

U.S. PATENT DOCUMENTS

| | | | |
|---|---|---|---|
| 6,190,378 B1 | 2/2001 | Jarvinen | |
| 7,479,139 B2 | 1/2009 | Cytron et al. | |
| 8,092,448 B2 * | 1/2012 | DeLonzor | A61B 18/02 606/22 |
| 8,475,441 B2 * | 7/2013 | Babkin | A61B 18/02 607/105 |
| 9,078,733 B2 | 7/2015 | Ramadhyani et al. | |
| 9,956,024 B2 | 5/2018 | Mahrouche et al. | |
| RE47,996 E | 5/2020 | Turner et al. | |
| 12,193,728 B2 * | 1/2025 | Narayan | A61B 18/1492 |

(Continued)

FOREIGN PATENT DOCUMENTS

| | | |
|---|---|---|
| CA | 2807277 C | 5/2020 |
| CN | 113952021 A | 1/2022 |

(Continued)

OTHER PUBLICATIONS

Golkar, E., Rao, P. P., Joskowicz, L., Gangi, A., & Essert, C. (2019). GPU-based 3D iceball modeling for fast cryoablation simulation and planning. International Journal of Computer Assisted Radiology and Surgery, 14, 1577-1588. (Year: 2019).*

(Continued)

*Primary Examiner* — Mamon Obeid
*Assistant Examiner* — Ashley Elizabeth Evans
(74) *Attorney, Agent, or Firm* — Duane Morris LLP

(57) ABSTRACT

A system for performing cryoablation treatments includes at least one computing device that is configured to obtain cryoablation operating information from one or more sensors coupled to a cryoablation treatment apparatus and to obtain patient information from one or more patient monitoring apparatuses. The computing device also obtains ice formation information characterizing one or more characteristics of an iceball produced by the cryoablation treatment apparatus and compares the ice formation information to an ice formation plan. If the ice formation information differs from the ice formation plan, the computing device adjusts one or more operating parameters of the cryoablation treatment apparatus.

16 Claims, 5 Drawing Sheets

(56) References Cited

U.S. PATENT DOCUMENTS

| | | | |
|---|---|---|---|
| 2004/0215295 | A1 | 10/2004 | Littrup et al. |
| 2005/0177146 | A1 | 8/2005 | Sherman |
| 2006/0155267 | A1 | 7/2006 | Berzak et al. |
| 2008/0027420 | A1 | 1/2008 | Wang et al. |
| 2009/0292280 | A1 | 11/2009 | Cytron et al. |
| 2009/0318804 | A1* | 12/2009 | Avital .................... A61B 90/11 600/445 |
| 2010/0168725 | A1 | 7/2010 | Babkin et al. |
| 2012/0191081 | A1 | 7/2012 | Markowitz |
| 2013/0060242 | A1 | 3/2013 | Babkin et al. |
| 2013/0289678 | A1 | 10/2013 | Clark et al. |
| 2014/0243808 | A1 | 8/2014 | Molnar-Hammond et al. |
| 2014/0330262 | A1 | 11/2014 | Jannicke et al. |
| 2017/0172791 | A1* | 6/2017 | Baust ........................ A61F 7/12 |
| 2018/0310978 | A1 | 11/2018 | Avitall |
| 2019/0216489 | A1 | 7/2019 | Lau |
| 2020/0107877 | A1 | 4/2020 | Koblish et al. |
| 2020/0108222 | A1 | 4/2020 | Bianco |
| 2021/0052314 | A1 | 2/2021 | Holsing et al. |
| 2021/0290285 | A1 | 9/2021 | Avitall et al. |
| 2021/0369393 | A1* | 12/2021 | Braido .................. A61B 18/12 |
| 2022/0110669 | A1 | 4/2022 | Chang et al. |
| 2022/0133381 | A1* | 5/2022 | Prologo ............... A61B 5/6852 606/21 |

FOREIGN PATENT DOCUMENTS

| | | |
|---|---|---|
| EP | 3766445 A1 | 1/2021 |
| EP | 3903705 A1 | 11/2021 |
| WO | 2008112005 A1 | 9/2008 |
| WO | 2008142686 A2 | 11/2008 |
| WO | 2021007348 A1 | 1/2021 |
| WO | 2021168367 A1 | 8/2021 |
| WO | 2022251236 A1 | 12/2022 |
| WO | 2023177828 A1 | 9/2023 |
| WO | 2023178243 A1 | 9/2023 |
| WO | 2023178247 A1 | 9/2023 |
| WO | 2023178274 A1 | 9/2023 |

OTHER PUBLICATIONS

Networked Robotics Corporation. (Jun. 2020). Monitoring Liquid Nitrogen Storage Dewars by weight. https://www.networkedrobotics.com/documentation/Monitoring-Liquid-Nitrogen-Storage-Dewars-by-Weight.pdf (Year: 2020).*

International Search Report and Written Opinion for PCT/US2023/064537 issued Jul. 4, 2023, 20 pages.

* cited by examiner

APPARATUSES AND METHODS FOR ADAPTIVELY CONTROLLING CRYOABLATION SYSTEMS

FIELD

The present disclosure relates to apparatuses and methods for performing cryoablation treatments. More particularly, the present disclosure relates to apparatuses and methods for performing cryoablation treatments that incorporate adaptive and quantitative monitoring and control of cryoablation systems during cryoablation treatments.

BACKGROUND

This section provides background information related to the present disclosure which is not necessarily prior art.

Systems and methods for providing cryoablation treatments may include cryoablation probes that are introduced at or near target tissue in a patient. A cryoablation system may include an extremely cold fluid (liquid, gas, or mixed phase) that may be passed through a probe in thermal contact with the target tissue. Heat from the tissue passes from the tissue, through the probe, and into the fluid that removes heat from the targeted tissue. This removal of heat causes tissue to freeze, resulting in the destruction of the targeted tissue. The cryoablation systems that deliver the cryo-fluid to the cryoprobe are typically controlled using predetermined procedures to control the various parameters of the cryoablation system. Such procedures can be determined by extensive testing that is performed with the cryoablation systems. The testing can be performed, for example, using tissue analogues or other testing methods to collect data to finalize treatment procedures.

Improvements to cryoablation apparatuses and methods are required to improve on the efficiency, efficacy and repeatability of cryoablation systems. Existing or traditional apparatuses and methods may not perform optimally because each patient and each treatment differs. Standardized procedures may, therefore, not provide optimal performance and optimal control to account for these difference and for conditions that may arise during the course of an individual treatment. There exists a need, therefore, for improved apparatuses and methods that can improve the performance and control of cryoablation systems.

SUMMARY

This section provides a general summary of the disclosure, and is not a comprehensive disclosure of its full scope or all of its features.

In some embodiments of the present disclosure a system for performing cryoablation treatments is provided. The system may include at least one computing device that is configured to obtain cryoablation operating information from one or more sensors coupled to a cryoablation treatment apparatus and to obtain patient information from one or more patient monitoring apparatuses. The computing device may also obtain ice formation information characterizing one or more characteristics of an iceball produced by the cryoablation treatment apparatus and compare the ice formation information to an ice formation plan. The computing device may also adjust one or more operating parameters of the cryoablation treatment apparatus when the ice formation information differs from the ice formation plan.

In one aspect, the systems of the present disclosure may automatically adjust the one or more operating parameters of the cryoablation treatment apparatus when the ice formation information differs from the ice formation plan by more than a predetermined amount.

In another aspect, the cryoablation treatment apparatus may include a dewar configured to hold a volume of cryo-fluid, a cryoprobe and a cryo-fluid path fluidly connecting the dewar to the cryoprobe.

In another aspect, the one or more sensors coupled to the cryoablation treatment apparatus may include a temperature sensor, a liquid level sensor, and a scale.

In another aspect, the patient information may include at least one of blood pressure, respiration rate, and heart rate.

In another aspect, the patient information may include imaging data, the imaging data obtained from one of an x-ray device, a computed tomography (CT) scan device, an ultrasound device and a magnetic resonance imaging (MRI) device.

In another aspect, the one or more operating parameters of the cryoablation treatment apparatus may include at least one of a flow rate of a cryo-fluid, a volume of the cryo-fluid and a temperature of the cryo-fluid.

In another aspect, the ice formation plan may include a size of the iceball, a growth rate of the iceball and a duration of the iceball.

In another aspect, the at least one computing device may adjust the operating parameters of the cryoablation treatment apparatus based on the cryoablation operating information and the patient information using an adaptive cryoablation module.

In another aspect, the adaptive cryoablation module comprises a trained machine learning model.

In some embodiments of the present disclosure, a method of performing a cryoablation treatment is provided. The method may include obtaining cryoablation operating information from one or more sensors coupled to a cryoablation treatment apparatus and obtaining patient information from one or more patient monitoring apparatuses. The method may also include obtaining ice formation information characterizing one or more characteristics of an iceball produced by the cryoablation treatment apparatus and comparing the ice formation information to an ice formation plan. The method may also include adjusting one or more operating parameters of the cryoablation treatment apparatus when the ice formation information differs from the ice formation plan.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
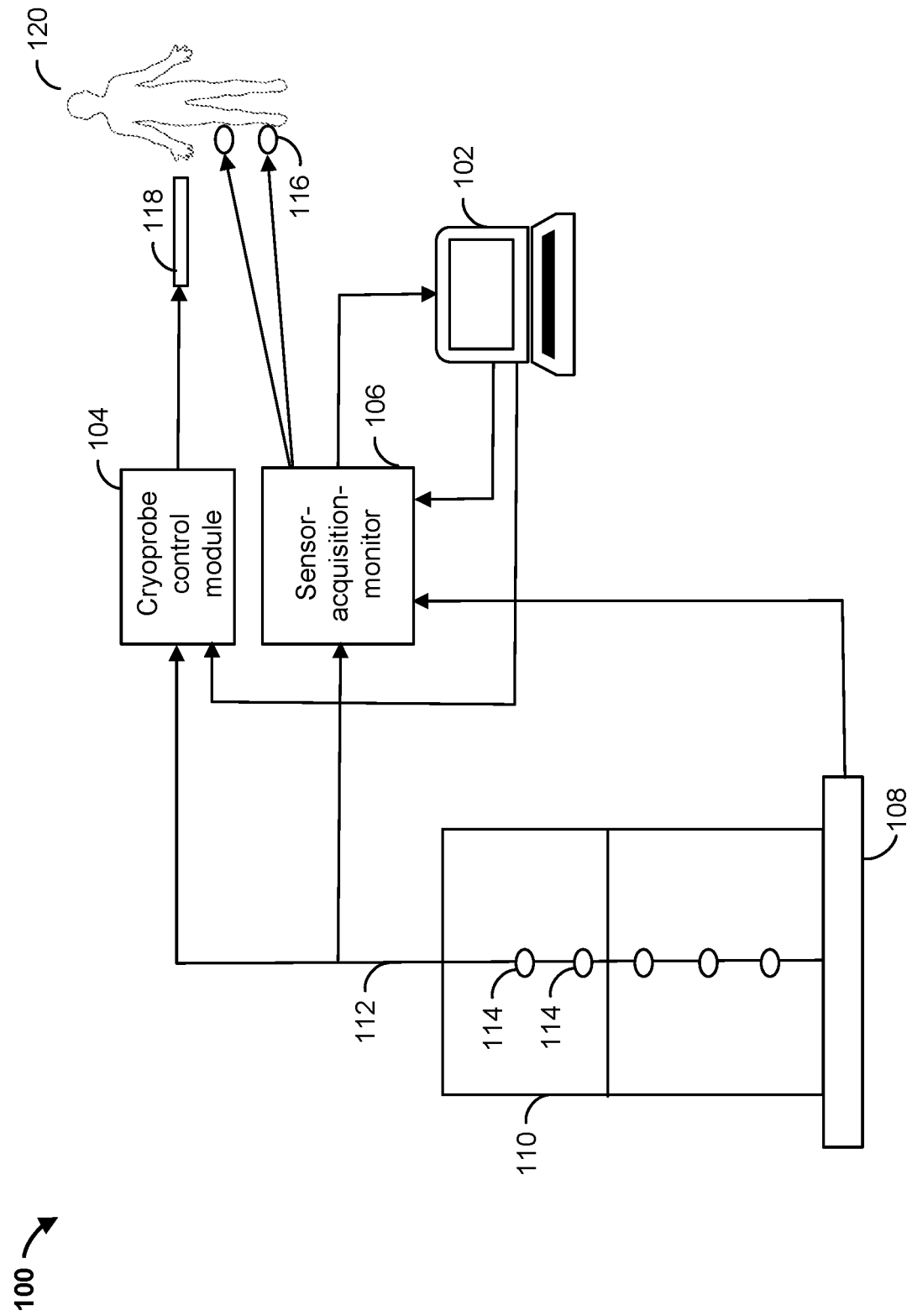
FIG. 1 is is a schematic illustrating an example cryoablation system in accordance with some embodiments of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

In accordance with some embodiments of the present disclosure, a cryoablation system is provided that includes one or more sensors positioned at various locations on the cryoablation system to collect data that characterizes an operating parameter of the cryoablation system. Such sensors may include operating temperatures, pressures, flow rates, fluid levels and the like. These sensors can be connected to a sensor-acquisition monitor that may monitor and store the operating parameter data. The cryoablation system may also include one or more patient sensors that can collect information regarding conditions or health status of the patient undergoing the cryoablation treatment. Other information can also be collected from other patient information systems that may be used in connection with the cryoablation treatment such as imaging devices and the like. The information from the patient sensors and from the patient information systems can also be connected to the sensor-acquisition monitor and/or to a cryoablation computing device.

The cryoablation computing device can be configured to adjust and/or control the operation of the cyroablation system based on the operating parameter information and/or the patient information. The cryoablation computing device may optimize and/or improve the cryoablation treatment by adjusting a flow of the cryo-fluid to the cryoprobe based on the operating parameter information and/or the patient information. In some examples, the cryoablation computing device may change the operating parameters of the cryoablation system based on one or more rules, thresholds or limits. In other examples, the cryoablation computing device may include a cryoablation module. The cryoablation module may include a trained machine learning model that is trained using test or historical data. The trained machine learning model may identify relationships between the operating parameter information and/or the patient information on the one hand and a treatment metric such as length of treatment, size of iceball, iceball growth rate, thaw rate or the like. The trained machine learning model may then be implemented to adaptively control the cryoablation system during treatment to optimize and improve its performance.

The cryoablation systems of the present disclosure may also use one or more elements or methods as described in U.S. patent application No. TBD entitled "APPARATUSES AND METHODS FOR SEQUENTIAL HEATING OF CRYO-FLUID IN CRYOABLATION SYSTEMS" filed on the same day as the present application by Varian Medical Systems, Inc., U.S. patent application No. TBD entitled "APPARATUSES AND METHODS FOR MONITORING AND CONTROLLING BLEEDING DURING CRYOABLATION TREATMENTS" filed on the same day as the present application by Varian Medical Systems, Inc., and U.S. patent application No. TBD entitled "APPARATUSES AND METHODS FOR THE CONTROL AND OPTIMIZATION OF ICE FORMATION DURING CYROABLATION TREATMENTS" filed on the same day as the present application by Varian Medical Systems, Inc., the disclosures of which are hereby incorporated by reference in their entireties.

As shown in FIG. 1, an example cryoablation system 100 is shown. The cryoablation system may include, for example, a cryoablation computing device 102, a cryoprobe control module 104, a sensor-acquisition module 106, a cryo-fluid source 110, a cryo-fluid supply 112, a cryoprobe 118, a smart scale module 108, one or more system sensors 114, and one or more patient sensors 116. The cryo-fluid source 110, the cryo-fluid supply 112 and the cryoprobe 118 may operate together to supply the cryo-fluid from the cryo-fluid source 110 through the cryo-fluid supply path 112 to the cryoprobe 118.

The cryo-fluid source 110 may be a suitable dewar or other vessel configured to hold a volume of cryo-fluid such as liquid nitrogen. The cryo-fluid supply path 112 may be a suitable tube, pipe, or other conduit that includes an internal opening to allow cryo-fluid from the cryo-fluid source 110 to flow therethrough. The cryoprobe 118 may be positioned at a distal end of the cryo-fluid supply path 112 opposite to (or downstream of) the cryo-fluid source 110. The cryo-fluid flowing from the cryo-fluid source 110 to the cryoprobe 118 can cool the tip of the cryoprobe 118 and cause an iceball to form at the tip of the cryoprobe 118. Since the cryoprobe 118 is positioned at or near a target tissue in the patient 120, the iceball will form at the target tissue and freeze the target tissue. This process may destroy the target tissue. The target tissue may be a tumor or other undesirable tissue formation. Thus, the undesirable tissue can be destroyed during such cryoablation treatment procedure.

Many factors can be used to determine a treatment plan for the patient 120. The size, location, type of the target tissue is one factor that is used to determine a treatment plan. Other patient characteristics can also be used such as an age, weight, overall health, other medical conditions and the like. Medical professionals may also use other health diagnostic tools during the preparation of a treatment plan. Such diagnostic tools may include tools to measure various patent health characteristics such as blood pressure, patient temperature, heart rate, respiration rate, and the like. Imaging tools may also be used to capture one or more images of the patient including images of the target tissue and surrounding tissues such as x-ray devices, computed tomography (CT) scan devices, ultrasound devices and magnetic resonance imaging (MRI) devices. In still other examples, other factors and information can be used to determine the treatment plan.

The treatment plan may include various aspects that describe the cryoablation treatment procedure(s) to be performed. The treatment plan, for example, may describe a location at which the tip of the cryoprobe 118 will be positioned in the patient 120. A cryo-profile and/or an ice formation plan may also be determined as part of the treatment plan. The ice formation plan may describe a size of the iceball that is desired during the procedure as well as a duration of freezing that may be performed. In some instances, it may be desirable to repeat one or more of a freezing and thawing step during the cryoablation treatment. For example, the treatment plan may detail that the cryoablation system will be used to freeze the target tissue (by forming an iceball) that surrounds one or more portions of the target tissue or that surrounds the entire target tissue. The affected region of the patient 120 may then be thawed. The freezing process can be repeated one or more times to improve the likelihood that the target tissue has been destroyed.

The ice formation plan may, for example, describe a size of the iceball to be formed during the cryoablation treatment, a growth rate of the iceball, and a location of the iceball. The treatment plan may also describe a duration of the freezing procedure and a duration of the freezing procedure. In other examples, the treatment plan and/or the ice formation plan may include other information such as information regarding thaw cycles and durations of such thaw cycles as well as a quantity of freezing and thaw cycles.

The details of the treatment not only describe a characteristics of the freezing cycle(s) relative to the target tissue but also describes characteristics relative to tissues that may be located proximate to or may be in areas of the patient 120 that surround the target tissue. As can be appreciated, it is desirable not only to destroy the target tissue, such as a tumor, but also to minimize the damage or harm to tissues or body structures that are located around the target tissue. It can be desirable, therefore, to limit the size of the iceball so that the iceball destroys the target tissue without causing permanent damage to surrounding healthy tissues and structures.

In traditional systems and methods of cryoablation, cryoprobes and related cryoablation systems are often tested in a laboratory to determine recommended procedures. Such laboratory settings, however, do not account for the specific environmental and patient conditions that arise during performance of an actual cryoablation treatment procedure. The specific conditions and characteristics of the patient, for example, are difficult to account for during testing of cryoablation systems because, among other limitations, tissue analogues are used during testing that may differ in one or more ways from actual patient tissues and patient characteristics.

The systems and methods of the present disclosure are improvement over such traditional or existing systems and methods because the systems and methods of the present disclosure allow operation of the cryoablation to adaptively control the operation of the system during the actual procedure and allow smart elements of the system to change one or more operating parameters of the cryoablation system. The systems and methods of the present disclosure may, for example, revise one or more operating parameters based on a determination that the freezing cycle and/or formation of the iceball is different from the ice formation plan. In other examples, the systems and methods of the present disclosure may change one or more operating parameters of the cryoablation system to minimize damage to healthy tissues or body structures of the patient. In still further examples, the systems and methods of the present disclosure may change one or more operating parameters of the cryoablation system to maximize the probability that the target tissue is destroyed.

Referring back to FIG. 1, the cryoablation system 100 may include the cryoablation computing device 102. The computing device 102 may be a workstation, laptop, server, or other processing device. The computing device 102 may be coupled to the sensor acquisition monitor 106 and to the cryoprobe control module 104. The sensor acquisition monitor 106 can, in turn, be coupled to one or more sensors or other information sources. The sensor acquisition monitor 106 can, for example, be a data acquisition unit or other signal processing device that can receive signals or information from sources and convert them into suitable data or measurements that can be processed by the computing device 102.

The cryoprobe control module 104 can be any suitable computing device, controller, or the like that can function to control one or more elements of the cryoablation system 100 to control the operating parameters of the cryoablation system 100. The cryoprobe control module 104 may have the capability, for example, to control the flow of the cryo-fluid in various phases (e.g., liquid or gas), to control the flow rate of the cryo-fluid, to control valves of the cryoablation system, to control heaters of the cryoablation system, to control exhausting of the cryo-fluid, to control heaters in the cryoprobe 118, to control a temperature of the cryoprobe 118, and other suitable functions.

In the example shown, the cryoablation system 100 includes several system sensors 114. The systems sensors 114 may be any suitable sensors that can obtain information regarding the operating conditions, settings or parameters of the cryoablation system 100. The system sensors 114 may include liquid level sensors that are configured to sense level or volume of cryo-fluid in the cryo-fluid source 110. The systems sensors 114 may include flow rate sensors configured to determine a flow rate of the cryo-fluid moving in the cryo-fluid supply 112. The system sensors 114 may also include pressure sensors that are configured to determine a pressure of the cryo-fluid in the cryo-fluid source 110, the cryo-fluid supply 112, and/or the cryoprobe 118. The system sensors may also include one or more temperature sensors positioned at various locations in the cryo-fluid source 110, the cryo-fluid supply 112, and/or the cryoprobe 118. The system sensors 114 may be positioned at any suitable location in or on the cryoablation system 100 in order to obtain measurements of the operating conditions of the system. In the example shown, the system sensors are shown positioned in the cryo-fluid source 110. In other examples, the systems sensors can be positioned at other locations including in or on the cryo-fluid supply 112 and/or in or on the cryoprobe 118.

Each of the system sensors 114 may be coupled to the sensor acquisition monitor 106. As such, the sensor acquisition monitor can then allow the information from the sensors to be passed to the cryoablation computing device 102 for further processing, for storage or for use in determining adaptive or other control actions to be performed by the cryoprobe control module 104.

The cryoablation system 100 may also include the smart scale module 108. The smart scale module 108 may be located proximate to the cryo-fluid source 110 to collect information regarding a weight of the cryo-fluid source 110. The smart scale module 108 can be used, for example, to determine a quantity or volume of cryo-fluid that may be located in the cryo-fluid source 110. The smart scale module 108 can be coupled to the sensor acquisition monitor 106 to collect the information regarding the weight of the cryo-fluid source 110 that can be, in turn, passed to the cryoablation computing device 102.

As further shown, the sensor acquisition monitor 106 may also be coupled to one or more patient sensors 116. The patient sensors 116 may include sensor or measuring devices that can collect information about the patient including the patient's health characteristics before, during and after the cryoablation treatment procedure. The patient sensors 116 may include blood pressure sensors, blood flow rate sensors, respiration sensors, patient temperature sensors, heart rate sensors, electrocardiogram (EKG) sensors, blood oxygen sensors and the like. These sensors and/or related equipment can pass patient health information to the sensor acquisition monitor and, in turn, to the cryoablation computing device 102.

While not shown, other patient health information systems can also be coupled to the sensor acquisition monitor and/or to the cryoablation computing device 102. Such other patient health information systems may include health record information and patient imaging systems such as x-ray devices, computed tomography (CT) scan devices, ultrasound devices and magnetic resonance imaging (MRI) devices or the like. The information from such systems can be passed to the cryoablation computing device 102 via the sensor acquisition monitor, for example. In other examples, the information may be obtained or send directly to the cryoablation computing device 102.

The elements of the cryoablation system 100, including the cryoprobe control module 104, the sensor acquisition monitor 106, the cryoablation computing device 102, the system sensors 114, the patient sensors 116, the smart scale module 108 and other health information systems may be coupled to each other using wireless or wired connections.

Wired communication modes include any mode of communication between points that utilize wired technology including various protocols and combinations of protocols associated with wired transmission, data, and devices. In various implementations, the wired communication modules may communicate in accordance with a number of wired protocols. Examples of wired protocols may comprise Universal Serial Bus (USB) communication, RS-232, RS-422, RS-423, RS-485 serial protocols, FireWire, Ethernet, Fiber Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, to name only a few examples.

Wireless communication modes may include any mode of communication between points (e.g., nodes) that utilize, at least in part, wireless technology including various protocols and combinations of protocols associated with wireless transmission, data, and devices. The points include, for example, wireless devices such as mobile telephones, computers and computer-related devices and components, such as printers, network-connected machinery such as a circuit generating system, and/or any other suitable device or third-party device. Wireless communications may include, for example, local area network (WLAN) protocols, including the Institute of Electrical and Electronics Engineers (IEEE) 802.xx series of protocols, such as IEEE 802.11a/b/g/n, IEEE 802.16, IEEE 802.20, and so forth. Other examples of wireless protocols may include various wireless wide area network (WWAN) protocols, such as GSM cellular radiotelephone system protocols with GPRS, CDMA cellular radiotelephone communication systems with 1×RTT, EDGE systems, EV-DO systems, EV-DV systems, HSDPA systems, and so forth. Further examples of wireless protocols may comprise wireless personal area network (PAN) protocols, such as an Infrared protocol, a protocol from the Bluetooth Special Interest Group (SIG) series of protocols, including Bluetooth Specification versions v1.0, v1.1, v1.2, v2.0, v2.0 with Enhanced Data Rate (EDR), as well as one or more Bluetooth Profiles, and so forth. Yet another example of wireless protocols may include near-field communication techniques and protocols, such as electromagnetic induction (EMI) techniques. An example of EMI techniques may include passive or active radio-frequency identification (RFID) protocols and devices. Other suitable protocols may comprise Ultra Wide Band (UWB), Digital Office (DO), Digital Home, Trusted Platform Module (TPM), ZigBee, and so forth.

Figure 2:
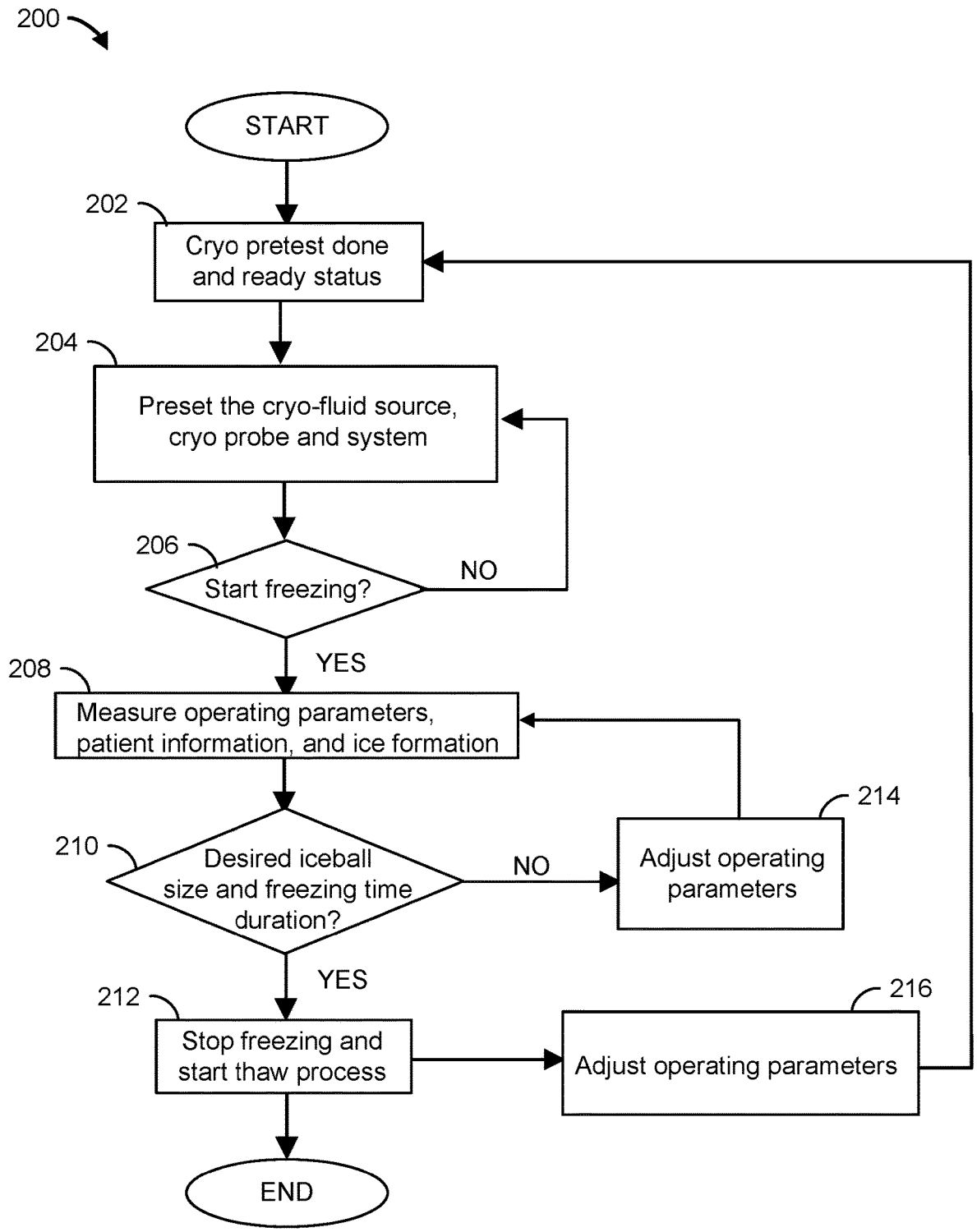
FIG. 2 is a flow chart illustrating an example method of adaptively controlling a cryoablation system of the present disclosure.

Referring now to FIG. 2, a method 200 of performing a cryoablation treatment is shown. The method may be performed by the cryoablation system 100 previously described. While other systems can also be used, the method 200 is described with reference to the cryoablation system 100 but should not be interpreted as limiting the method.

The method 200 may begin at step 202 at which the cryoablation computing device 102 may indicate a ready status. A cryo pretest may have been performed. The cryo pretest may execute various commands to determine that the various elements of the cryoablation system 100 are ready and operating in a normal manner. The cryo pretest may, for example, receive information from the system sensors 114 and/or the patient sensors 116 that indicates that the cryoablation system is operating in a normal or ready state and that the cryo-fluid source 110, the cryo-fluid supply 112 and the cryoprobe 118 is ready to begin a cryoablation treatment. The cryoablation computing device 102 may include a user interface that can display the measurements of the system sensors 114 and/or the patient sensors 116. The user interface may also display a status of the cryoablation system 100 such as a ready status indicator.

At step 204, the cryoablation computing device 102 can preset cryo-fluid source 110, the cryoprobe 118 and/or other elements of the cryoablation system 100. The cryoablation computing device 102 can preset the various operating parameters of the cryoablation system 100 using the cryoprobe control module 104, for example. The preset operating parameters may be determined as part of determining a treatment plan as previously described. The preset operating parameters of the cryoablation system 100 may include, for example, an operating pressure, an operating temperature and/or a positioning of the cryoprobe.

At step 206, the cryoablation computing device 102 can determine whether to begin a freezing procedure using the cryoablation system 100. the cryoablation computing device 102 can determine to begin freezing when the operating parameters of the cryoablation system are within a predetermined tolerance of the preset parameters of the treatment plan. For example, the cryoablation computing device 102 can receive measurements of the operating parameters from the system sensors 114, the smart scale module 108, the patient sensors 116 and/or from other health information sensors. If the cryoablation computing device 102 determines, for example, that the pressure in the system is with a predetermined operating zone, the temperature of the cryo-fluid is with a predetermined temperature and/or if the cryoprobe is positioned in a desired position, then the cryoablation computing device may begin a freezing cycle. If the cryoablation computing device 102 determines that one or more of the operating conditions or patient characteristics is not within a predetermined zone, the cryoablation computing device 102 may not initiate the freezing cycle and return to step 204.

When the cryoablation computing device 102 starts a freezing cycle, the device 102 may, at step 208, measure and/or monitor various operating parameters and patient characteristics. During the freezing cycle, the cryo-fluid is flowing to the cryoprobe 118 and lowering the temperature of the cryoprobe 118 and the tissue surrounding the cryoprobe 118 to a temperature level at which an iceball begins to form around the tip of the cryoprobe 118. As such a process is occurring, the information from the system sensors 114, the smart scale module 108, the patient sensors 116 and/or other health information systems can be provided to the cryoablation computing device 102.

At step 210, the cryoablation computing device 102 may determine whether adjustments are required to the operating parameters of the cryoablation system 100. In one example as shown, the cryoablation computing device 102 may determine if the iceball that is forming at the cryoprobe 118 has a desired size, is growing at a desired rate and/or has been formed for a desired freezing time duration. These characteristics of the iceball may be described in the treatment plan and/or the ice formation plan. If the cryoablation computing device 102 determines that no changes to the operating conditions are required and/or that the iceball is forming in accordance with the ice formation plan, the method may move to step 212. If the cryoablation computing device determines that changes are required because, for example, the iceball is not being formed in accordance with the ice formation plan, the method may move to step 214.

In some examples, the cryoablation computing device 102 may obtain patient information in the form of imaging data from one or more imaging devices. Such imaging devices may include, for example, an x-ray device, a computed tomography (CT) scan device, an ultrasound device and a magnetic resonance imaging (MRI) device. The imaging data may include real-time or periodic information regarding the growth and size of the iceball in the patient. The cryoablation computing device 102 may compare the imaging data to information in the ice formation plan to determine if the iceball size, growth, position, etc. is forming in accordance with the plan. If the iceball is growing according to the ice formation plan, the method can move to step 212. If not, the method 200 can move to step 214. In other examples, the cryoablation computing device 102 may determine that changes are required if the patient information indicates that the patient is undergoing undesirable stress or that the patient information indicates other undesirable characteristics.

At step 214, the cryoablation computing device 102 may adjust the operating parameters of the cryoablation system 100. The cryoablation computing device 102 may, for example, increase or decrease a pressure of the cryo-fluid source, increase or decrease a temperature of the cryoprobe 118, increase or decrease a flow rate of the cryo-fluid, and/or make other changes. The cryoablation computing device 102 may, for example, send a signal to the cryoprobe control module to open or close a valve, to turn on or turn off a heater, to increase or decrease a speed of a pump or take other suitable action. After adjustment of the operating parameters, the method 200 may return to step 208.

The cryoablation computing device 102 may make the changes or adjustments to the cryoablation using any suitable methodology. In some examples, the cryoablation computing device 102 may include adaptive cryoablation module that may use an algorithm or other function to determine an appropriate action. In such examples, the adaptive cryoablation module may include a regression model or other algorithm to determine a relationship between the operating parameters of the system and the iceball formation.

In other examples, the adaptive cryoablation module may include a trained machine learning model. The trained machine learning model may use artificial intelligence to determine complex relationships between the operating parameters of the cryoablation system 100, the patient information and the iceball formation. The trained machine learning model can then be used by the cryoablation computing device 102 to determine what adjustments should be made to the cryoablation system 100 to cause the iceball formation to follow the ice formation plan.

The adaptive cryoablation module may include one or more data models created using machine learning and/or artificial intelligence. Machine learning may involve training a mathematical model in a supervised or unsupervised setting. Machine learning models may be trained to learn relationships between various groups of data. The models may be based on a set of algorithms that are designed to model abstractions in data by using a number of processing layers. The processing layers may be made up of non-linear transformations. Machine learning models may include, for example, neural networks, convolutional neural networks and deep neural networks. Such neural networks may be made of up of levels of trainable filters, transformations, projections, hashing, and pooling. The models may be used in large-scale relationship-recognition tasks. The models can be created by using various open-source and proprietary machine learning tools and/or libraries known to those of ordinary skill in the art. Examples of the machine learning models that can be employed by the systems of the present disclosure are further described below.

At step 212, the cryoablation computing device 102 may stop the freezing cycle and start a thaw cycle. If such thaw cycle is final cycle in the treatment plan, the method 200 may end. If the thaw cycle is not the final cycle, the method 200 may proceed to step 216. At step 216, the cryoablation computing device may adjust the operating parameters of the cryoablation system to cause the thaw cycle to proceed such as to turn on a heater in the cryo fluid source 110 or in the cryoprobe 118. The cryoablation computing device 102 may also open one or more valves to exhaust gaseous cryo-fluid. The method 200 may then return to step 202 if another freezing and/or thaw cycle is included in the treatment plan. The method may then perform steps 202 through 212 again until all cycles have performed.

Figure 3:
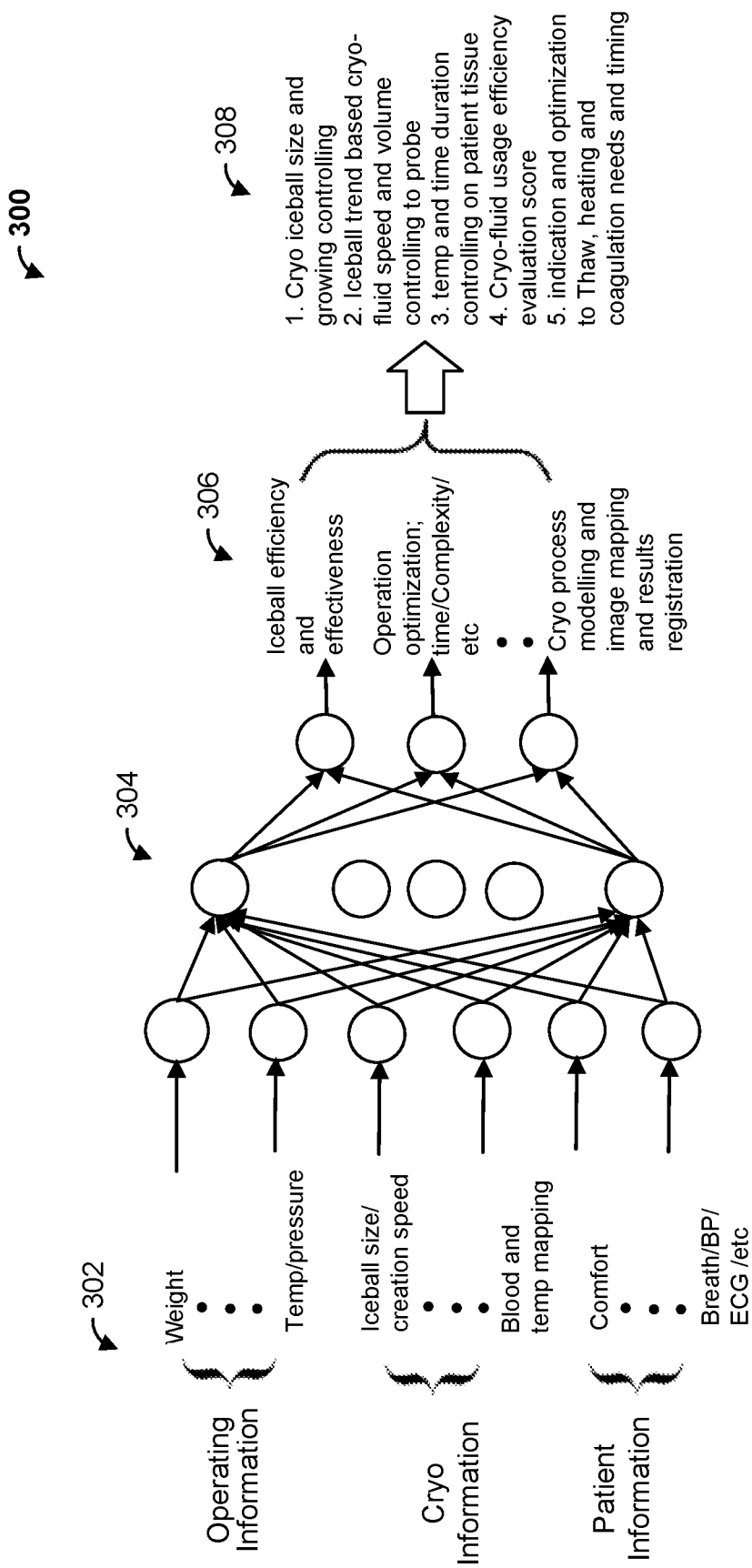
FIG. 3 is a diagram illustrating an example adaptive cryoablation module that can be used in connection with one or more cryoablation systems and methods of the present disclosure.

One example of an adaptive cryoablation module 300 is shown in FIG. 3. In this example, the cryoablation module 300 is a trained machine learning model. The figure illustrates the input data or features 302 that can be used to determine complex relationships between the information collected by the cryoablation system 100 and the effects on various performance or result characteristics 306. Any suitable machine learning module 304 such as deep learning, neural network, artificial neural network, simulated neural network or the like can be used. The module 304 shows one layer but the module may use multiple hidden layers as well.

As shown, the input data 302 may include operating information, cryo information and/or patient information. In other examples, other input data can also be used. The operating information may include various types of information that characterizes the operating parameters and operating conditions of the cryoablation system 100. This information may be collected by the system sensors 114, the smart scale module 108 via the sensor acquisition monitor 106. The operating information may include weight information, temperature information, pressure information, flow rate information, liquid level information and the like. The cryo information may include various types of information regarding the cryoablation treatment procedure. The cryo information may be collected via health systems, imaging systems and the like. This information may include iceball size, iceball growth rate, iceball location, iceball shape, blood temperature, blood flow, and the like. The patient information may include information concerning the patient undergoing the cryoablation treatment. The patient information may be collected by the patient sensors 116 via the sensor acquisition monitor, for example. The patient information may include heart rate, comfort level, pain level, imaging information, patient temperature, respiration rate, blood pressure and the like.

The adaptive cryoablation module 300 may output one or more result characteristics 306 that can identify and/or predict a performance or characteristic of the cryoablation treatment. The outputs 306 may include performance characteristics such as iceball efficiency and/or iceball effectiveness that may measure the ability of the iceball produced during a treatment in destroying the target tissue. Other outputs 306 may include operation time, operating complexity and operation effectiveness measures. Still other outputs 306 may include cryo process modeling, image mapping and result registration. In yet other examples, the output 306 may include other characteristics and information.

The outputs 306 may be used to determine actions 308 that may be taken during a cryoablation treatment. The actions 308 may be taken by the cryoablation computing device 102 to improve, optimize or modify the performance of the cryoablation treatment. For example, actions 308 may include controlling a size and growth rate of the iceball, varying or controlling the flow rate, speed or volume of the cryo-fluid, varying or controlling the temperature of the cryoprobe or the cryo-fluid, varying or controlling a duration of a freeze or thaw cycle. Still further, the outputs 306 may be used to optimize and/or improve the efficiency of the cryoablation treatment, including modifying or controlling various operating parameters of the cryoablation system 100.

Figure 4:
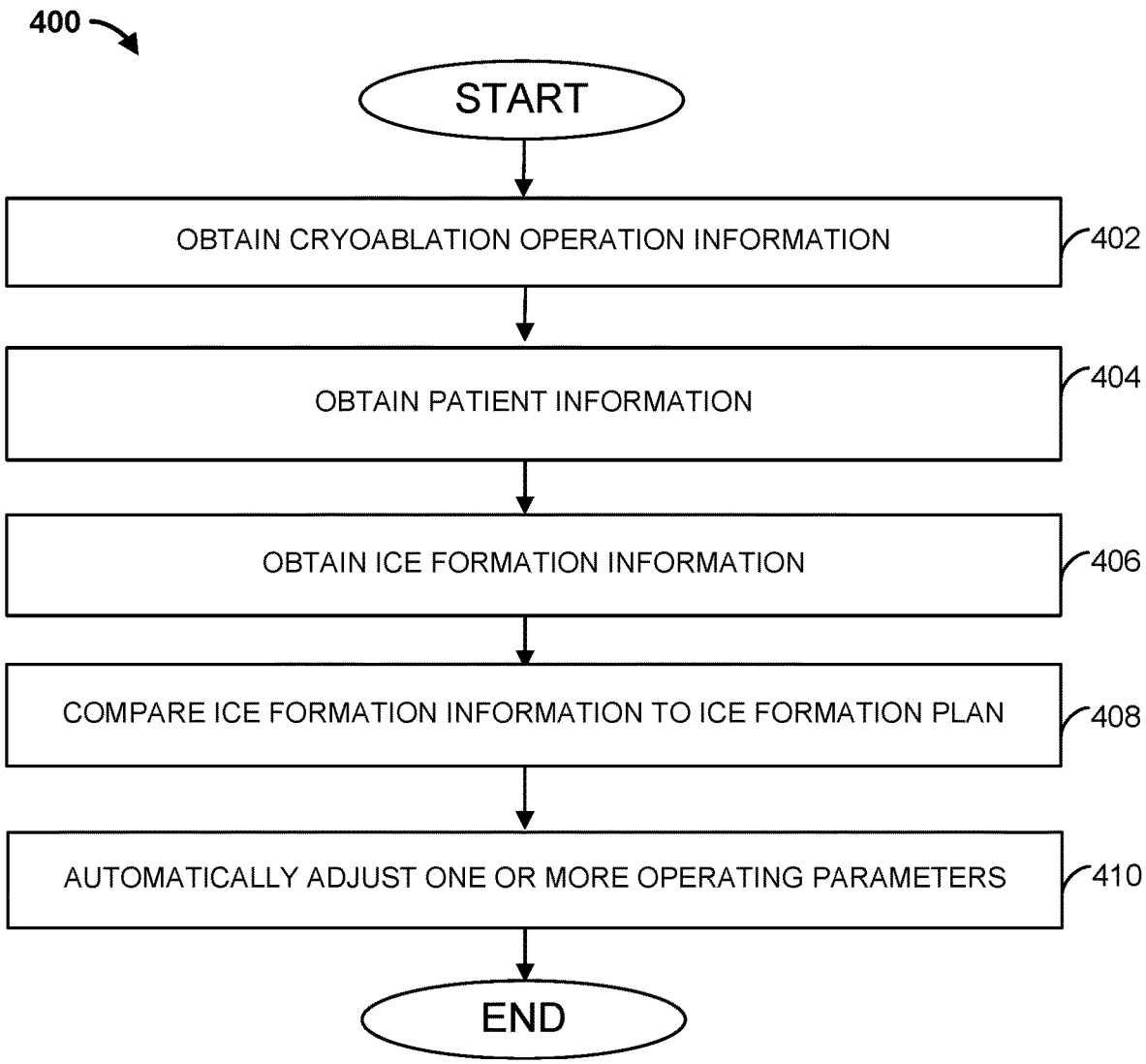
FIG. 4 is another example method of performing a cryoablation treatment in accordance with some embodiments of the present disclosure.

As shown in FIG. 4, an example method 400 of performing a cryoablation treatment is shown. The method 400 may be performed by various cryoablation systems. For the sake of brevity, the method 400 is described with reference to the cryoablation system 100. It should be appreciated, however, that other cryoablation systems can be used as well as variations of the cryoablation system 100.

The method 400 may begin at step 402. At step 402, cryoablation computing device 102 may obtain cryoablation operating information. The cryoablation computing device 102 may obtain the cryoablation operating information from one or more sensors such as from the system sensors 114. The operating information may include data or information regarding one or more operating parameters of the cryoablation system 100 such as temperatures, pressures, valve status, flow rate, weight, liquid level, volume, and the like.

At step 404, the cryoablation computing device 102 may obtain patient information. The patient information may include various types of data from various sources such as from the patient sensors 116, from imaging devices, from other health information sources that may be stored in servers, databases or other storage devices, or from other patient monitoring apparatuses. The patient information may include, for example, heart rate information, blood pressure information, comfort level information, pain information, temperature information, target tissue imaging information, respiration information, blood flow information and the like.

At step 406, the cryoablation computing device 102 may obtain ice formation information. The ice formation information may include various types of information that describes the growth of an iceball at or around the target tissue. The ice formation information may be obtained from one or more ice measuring devices and/or from one or more imaging devices. The imaging devices may include an x-ray device, a computed tomography (CT) scan device, an ultrasound device or a magnetic resonance imaging (MRI)

device. The ice formation information may include a size, shape, growth rate, temperature or other information.

At step 408, the cryoablation computing device may compare the ice formation information to the ice formation plan. The ice formation plan may be determined as part of determining a treatment plan. The ice formation plan may describe one or more characteristics of the iceball that should be formed during the cryoablation treatment to destroy the target tissue. The ice formation plan may include information for a planned size, location, growth rate, temperature of an iceball. The cryoablation computing device may compare ice formation data to the ice formation plan by comparing one or more the iceball characteristics. The step 408 may also include inputting one or more of the operation information and/or the patient information into the adaptive cryoablation module 300 to predict and/or determine a growth of the iceball versus the ice formation plan.

If the ice formation information differs from the ice formation plan, the cryoablation computing device 102 may automatically adjust one or more operating parameters of the cryoablation system 100. By automatically adjusting, the cryoablation computing device 102 may take such action without interaction with a user or with minimal action from a user, such as to approve the adjustment recommended by cryoablation computing device 102. The cryoablation computing device 102 may make and adjustment if it determines that the ice formation information differs by more than a predetermined amount from the ice formation plan. In other examples, the cryoablation computing device may take action and adjust the operating parameters when the algorithm or trained machine learning model of the adaptive cryoablation module 300 determines that iceball will not form according to the ice formation plan and/or may vary from ice formation plan by more than a predetermined threshold.

At step 410, the cryoablation computing device 102 may automatically adjust one or more parameters. The operating parameters may include a cryo-fluid flow rate, a cryo-fluid temperature, a cryo-fluid volume, a valve status, a heater status or the like.

As can be appreciated, the method 400 may be continuously or periodically performed during a cryoablation treatment to monitor and adjust operating parameters. By using the method 400 (or variations thereof), the effectiveness, efficiency and performance of the cryoablation treatment can be improved over existing or traditional systems and methods.

Figure 5:
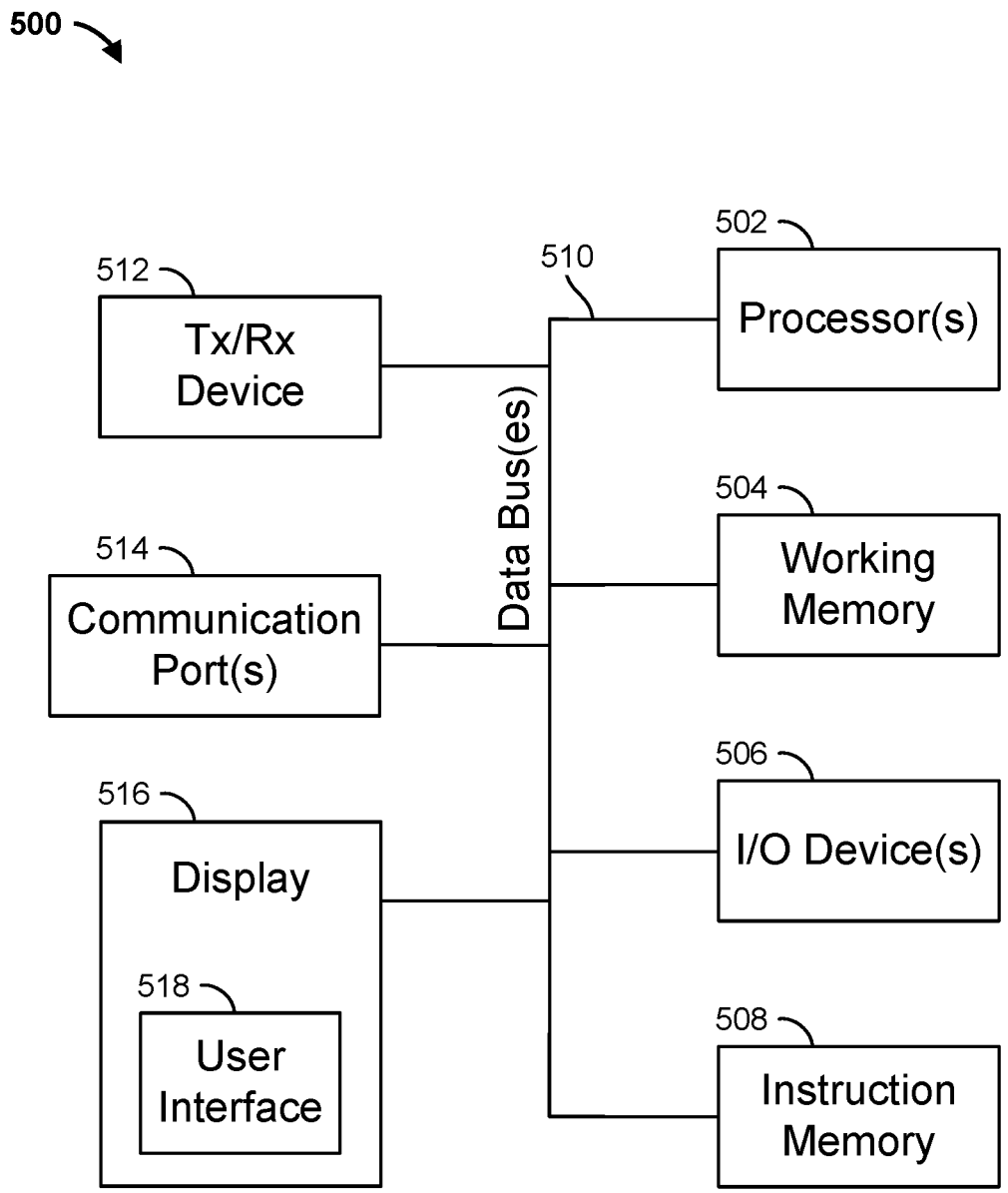
FIG. 5 is a schematic illustrating an example computing device that can be used on one or more embodiments of the present disclosure.

Referring now to FIG. 5, an example computing device 500 is shown. The cryoablation system 100 may include one or more computing devices 500. For example, the cryoablation computing device 102 may have the elements shown in FIG. 5. The methods of the present disclosure, such as methods 200 and 500, may be performed, or steps of such methods may be performed, by a computing device 500.

As shown, the computing device 500 may include one or more processors 502, working memory 504, one or more input/output devices 506, instruction memory 508, a transceiver 512, one or more communication ports 514, and a display 516, all operatively coupled to one or more data buses 510. Data buses 510 allow for communication among the various devices. Data buses 510 can include wired, or wireless, communication channels.

Processors 502 can include one or more distinct processors, each having one or more cores. Each of the distinct processors can have the same or different structure. Processors 502 can include one or more central processing units (CPUs), one or more graphics processing units (GPUs), application specific integrated circuits (ASICs), digital signal processors (DSPs), and the like.

Processors 502 can be configured to perform a certain function or operation by executing code, stored on instruction memory 508, embodying the function or operation. For example, processors 502 can be configured to perform one or more of any function, step, method, or operation disclosed herein.

Instruction memory 508 can store instructions that can be accessed (e.g., read) and executed by processors 502. For example, instruction memory 508 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 502 can store data to, and read data from, working memory 504. For example, processors 502 can store a working set of instructions to working memory 504, such as instructions loaded from instruction memory 508. Processors 502 can also use working memory 504 to store dynamic data created during the operation of cryoablation computing device 102. Working memory 504 can be a random access memory (RAM) such as a static random access memory (SRAM) or dynamic random access memory (DRAM), or any other suitable memory.

Input-output devices 506 can include any suitable device that allows for data input or output. For example, input-output devices 506 can include one or more of a keyboard, a touchpad, a mouse, a stylus, a touchscreen, a physical button, a speaker, a microphone, or any other suitable input or output device.

Communication port(s) 514 can include, for example, a serial port such as a universal asynchronous receiver/transmitter (UART) connection, a Universal Serial Bus (USB) connection, or any other suitable communication port or connection. In some examples, communication port(s) 514 allows for the programming of executable instructions in instruction memory 508. In some examples, communication port(s) 514 allow for the transfer (e.g., uploading or downloading) of data.

Display 516 can display a user interface 518. User interfaces 518 can enable user interaction with the cryoablation computing device 102. For example, user interface 518 can be a user interface that allows an operator to interact, communicate, control and/or modify different messages, settings, or features that may be presented or otherwise displayed to a user. The user interface 518 can include a slider bar, dialogue box, or other input field that allows the user to control, communicate or modify a setting, limitation or input that is used in a cryoablation treatment. In addition, the user interface 518 can include one or more input fields or controls that allow a user to modify or control optional features or customizable aspects of the cryoablation computing device 102 and/or the operating parameters of the cryoablation system 100. In some examples, a user can interact with user interface 518 by engaging input-output devices 506. In some examples, display 516 can be a touchscreen, where user interface 518 is displayed on the touchscreen. In other examples, display 516 can be a computer display that can be interacted with using a mouse or keyboard.

Transceiver 512 allows for communication with a network. In some examples, transceiver 512 is selected based on the type of communication network cryoablation computing device 102 will be operating in. Processor(s) 202 is operable to receive data from, or send data to, a network, such as wired or wireless network that couples the elements of the cryoablation system 100 of FIG. 1.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for performing cryoablation treatments comprising at least one computing device coupled to a cryoablation treatment apparatus comprising at least one cryoprobe, a dewar configured to hold a volume of cryo-fluid, and a cryo-fluid path fluidly connecting the dewar to the cryoprobe, the computing device configured to: obtain cryoablation operating information, during a cryoablation treatment, from one or more sensors coupled to the cryoablation treatment apparatus, the cryoablation operating information comprising information characterizing one or more operating parameters of the cryo-fluid in the cryoablation treatment apparatus, wherein at least one of the one or more sensors is positioned in the at least one cryoprobe; obtain patient information from one or more patient monitoring apparatuses during the cryoablation treatment; obtain ice formation information characterizing one or more characteristics of an iceball produced by the cryoablation treatment apparatus during the cryoablation treatment; compare the ice formation information to an ice formation plan; and automatically adjust and implement a change to at least one of a flow rate of a cryo-fluid, a volume of the cryo-fluid and a temperature of the cryo-fluid during the cryoablation treatment without input from the user when the ice formation information differs from the ice formation plan wherein an amount of the change is determined by an adaptive cryoablation module based on the cryoablation operating information, the patient information and the ice formation information wherein the adaptive cryoablation module comprises a trained machine learning model, the trained machine learning model configured to receive the cryoablation operating information, the patient information and the ice formation information as inputs and to output an iceball efficiency or an iceball effectiveness that measures an ability of the iceball produced during the treatment in destroying a target tissue.

2. The system of claim 1, wherein the at least one computing device is configured to automatically adjust the one or more operating parameters of the cryoablation treatment apparatus when the ice formation information differs from the ice formation plan by more than a predetermined amount.

3. The system of claim 1, wherein the one or more sensors coupled to the cryoablation treatment apparatus comprises a temperature sensor, a liquid level sensor, and a scale.

4. The system of claim 1, wherein the patient information comprises at least one of blood pressure, respiration rate, and heart rate.

5. The system of claim 1, wherein the ice formation information comprises imaging data, the imaging data obtained from one of an x-ray device, a computed tomography (CT) scan device, an ultrasound device and a magnetic resonance imaging (MRI) device.

6. The system of claim 1, wherein ice formation plan comprises a size of the iceball, a growth rate of the iceball and a duration of the iceball.

7. The system of claim 1, wherein the adaptive cryoablation module comprises a trained machine learning model, the trained machine learning model using inputs comprising the cryoablation operating information, the patient information, and the ice formation information obtained during the cryoablation treatment to determine the amount of the change implemented by the at least one computing device.

8. A method for performing cryoablation treatment, the method comprising: obtaining cryoablation operating information from one or more sensors coupled to a cryoablation treatment apparatus during a cryoablation treatment, the cryoablation treatment apparatus comprising at least one cryoprobe, a dewar configured to hold a volume of cryo-fluid, and a cryo-fluid path fluidly connecting the dewar to the cryoprobe, and the cryoablation operating information comprising information characterizing one or more operating parameters of the cryoablation treatment apparatus; obtaining patient information from one or more patient monitoring apparatuses during the cryoablation treatment; obtaining ice formation information characterizing one or more characteristics of an iceball produced by the cryoablation treatment apparatus during the cryoablation treatment; comparing the ice formation information to an ice formation plan; and automatically adjusting and implementing a change to at least one of a flow rate of a cryo-fluid, a volume of the cryo-fluid and a temperature of the cryo-fluid during the cryoablation treatment without input from the user when the ice formation information differs from the ice formation plan wherein an amount of the change is determined by an adaptive cryoablation module based on the cryoablation operating information, the patient information and the ice formation information wherein the adaptive cryoablation module comprises a trained machine learning model, the trained machine learning model configured to receive the cryoablation operating information, the patient information and the ice formation information as inputs and to output an iceball efficiency or an iceball effectiveness that measures an ability of the iceball produced during the treatment in destroying a target tissue.

9. The method of claim 8, wherein the step of adjusting the one or more operating parameters of the cryoablation treatment apparatus is performed when the ice formation information differs from the ice formation plan by more than a predetermined amount.

10. The method of claim 8, wherein the one or more sensors coupled to the cryoablation treatment apparatus comprises a temperature sensor, a liquid level sensor, and a scale.

11. The method of claim 8, wherein the patient information comprises at least one of blood pressure, respiration rate, and heart rate.

12. The method of claim 8, wherein the ice formation information comprises imaging data, the imaging data obtained from one of an x-ray device, a computed tomography (CT) scan device, an ultrasound device and a magnetic resonance imaging (MRI) device.

13. The method of claim 8, wherein ice formation plan comprises a size of the iceball, a growth rate of the iceball and a duration of the iceball.

14. The method of claim 8, wherein the adaptive cryoablation module comprises a trained machine learning model, the trained machine learning model using inputs comprising the cryoablation operating information, the patient information, and the ice formation information obtained during the cryoablation treatment to determine the amount of the change implemented by the at least one computing device.

15. The system of claim 3, wherein: the temperature sensor is positioned in the cryo-fluid supply; the liquid level sensor is positioned in the dewar and is configured to provide a liquid level of the cryo-fluid in the dewar; and the scale is positioned proximate the dewar and is configured to provide information regarding a volume of the cryo-fluid in the dewar.

16. The method of claim 10, wherein: the temperature sensor is positioned in the cryo-fluid supply; the liquid level sensor is positioned in the dewar and is configured to provide a liquid level of the cryo-fluid in the dewar; and the scale is positioned proximate the dewar and is configured to provide information regarding a volume of the cryo-fluid in the dewar.

* * * * *